United States Patent
Irick, Jr. et al.

(10) Patent No.: US 6,767,972 B1
(45) Date of Patent: Jul. 27, 2004

(54) METHODS FOR SLOWING THE DEGRADATION RATE OF BIODEGRADABLE POLYMERS AND BIODEGRADABLE POLYMER COMPOSITIONS AND COMPOSITIONS THEREOF

(75) Inventors: Gether Irick, Jr., Gray, TN (US); Ronald Richard Light, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/662,965

(22) Filed: Sep. 15, 2000

(51) Int. Cl.⁷ ............................................... C08L 67/02
(52) U.S. Cl. ...................... 525/445; 525/59; 525/133.5; 525/404; 525/412; 525/450; 525/938; 524/37; 524/38; 524/39; 524/211
(58) Field of Search .............................. 525/445, 133.5, 525/412, 404, 450, 59, 938; 524/37, 38, 39, 211

(56) References Cited

U.S. PATENT DOCUMENTS

| | | | |
|---|---|---|---|
| 5,169,889 A | * 12/1992 | Kauffman | 524/270 |
| 5,252,646 A | * 10/1993 | Iovine | 524/270 |
| 5,292,783 A | 3/1994 | Buchanan et al. | |
| 5,312,850 A | 5/1994 | Iovine et al. | |
| 5,446,079 A | 8/1995 | Buchanan et al. | |
| 5,457,175 A | 10/1995 | Scharrer et al. | |
| 5,480,962 A | 1/1996 | White et al. | |
| 5,498,453 A | 3/1996 | White et al. | |
| 5,545,485 A | * 8/1996 | Hashitani | 428/423.1 |
| 5,559,171 A | 9/1996 | Buchanan et al. | |
| 5,580,911 A | 12/1996 | Buchanan et al. | |
| 5,583,187 A | * 12/1996 | Sharak | 525/438 |
| 5,599,858 A | 2/1997 | Buchanan et al. | |
| 5,750,605 A | * 5/1998 | Blumenthal | 524/230 |
| 5,753,364 A | * 5/1998 | Rutherford | 428/355 |
| 5,900,322 A | 5/1999 | Buchanan et al. | |
| 5,952,405 A | * 9/1999 | Schoenberg | 524/81 |

FOREIGN PATENT DOCUMENTS

| | | |
|---|---|---|
| EP | 0 736 557 A | 10/1996 |
| GB | 1012045 | 12/1965 |
| JP | 05 339557 A | 12/1993 |
| JP | 2000 007903 A | 1/2000 |
| JP | 2000 007903 | * 1/2000 |

* cited by examiner

*Primary Examiner*—Patricia A. Short
(74) *Attorney, Agent, or Firm*—Bernard J. Graves, Esq.; Betty J. Boshears, Esq.; Eric Middlemas

(57) ABSTRACT

The invention provides a biodegradable polymer composition comprising a biodegradable polymer and a phenol-containing compound mixed with the polymer. The phenol-containing compound is present in the biodegradable polymer at an amount sufficient to slow the degradation rate of the biodegradable polymer. The invention also pertains to a method for slowing the degradation rate of a biodegradable polymer.

13 Claims, No Drawings

METHODS FOR SLOWING THE DEGRADATION RATE OF BIODEGRADABLE POLYMERS AND BIODEGRADABLE POLYMER COMPOSITIONS AND COMPOSITIONS THEREOF

FIELD OF THE INVENTION

The present invention relates to biodegradable polymers or biodegradable polymer compositions having a phenol-containing compound and methods for making such polymers. In a major aspect, phenol-containing compound is included in the biodegradable polymer or biodegradable polymer compositions at an amount sufficient to slow the degradation rate thereof.

BACKGROUND OF THE INVENTION

From an environmental perspective, biodegradable polymers are an attractive alternative to the more prevalent traditional petroleum-based nonbiodegradable polymers. Biodegradable polymers do not have to be landfilled and thus contribute less to the solid waste problem created now being experienced by society. Further, since biodegradable polymers eventually re-enter normal geochemical cycles over time, they are less likely to become an entrapment or an ingestion hazard to wildlife.

Biodegradation is defined as a process carried out by microbes; e.g., bacteria or fungi, wherein a polymer chain is cleaved via enzymatic activity to form monomers or short chains. Hydrolysis and oxidation are believed to be the two principal mechanisms by which polymers are degraded. Microbes generally assimilate the monomers or short chains. For example, in an aerobic environment, these monomers or short chains are ultimately oxidized to carbon dioxide, water, and new cell biomass. In an anaerobic environment, the monomers or short chains are ultimately transformed into carbon dioxide, water, acetate, methane, and cell biomass. Efficient biodegradation requires that direct physical contact be established between the biodegradable material and the active microbial population or the enzymes produced by the active microbial population.

Many biodegradable polymers have been developed and are currently used in various plastic products. Cellulose or cellulose derivatives having a low degree of substitution (DS) may be biodegradable under certain conditions. Cellulose can be degraded in the environment by both anaerobic or aerobic microorganisms. Typical endproducts of this microbial degradation include cell biomass, methane, carbon dioxide, water, and other fermentation products. The ultimate endproducts depend upon the type of environment as well as the type of microbial population that is present. Cellulose esters form hard, clear plastics and thus are suitable for eyeglass frames, toys, toothbrush handles, and the like. With the prevalence of cellulose ester materials in consumer products, it is desirable to have the ability to make biodegradable materials therefrom.

Polyhydroxyalkanoates (PHA), such as polyhydroxybutyrate (PHB), polycaprolactone (PCL), or copolymers of polyhydroxybutyrate and polyhydroxyvalerate (PHBV), have been known for at least twenty years. With the exception of polycaprolactone, they are generally prepared biologically and have been reported to be biodegradable.

U.S. Pat. Nos. 5,480,962 and 5,498,453 to White et al., which are herein incorporated by reference as if fully disclosed herein, describe aliphatic copolyesters having repeat units prepared from succinic and adipic acid, including those containing 1,4-butanediol-derived moieties. These patents indicate that such copolyesters could be used in disposable articles as a result of their propensity to undergo microbial degradation in a composting environment. Examples of appropriate disposable articles in which the aliphatic-copolyesters may be used are food packages, other types of packaging materials, garbage bags, lawn bags, and agricultural mulch films.

U.S. Pat. Nos. 5,292,783, 5,446,079, 5,559,171, 5,580,911, 5,599,858, and 5,900,322, to Buchanan et al., are incorporated by reference as if fully disclosed herein. These patents describe biodegradable polymers, such as aliphatic-aromatic copolyesters, aliphatic polyesters, cellulose esters, blends of cellulose esters and aliphatic-aromatic copolyesters, blends of cellulose esters and aliphatic polyesters, and blends of cellulose esters, aliphatic-aromatic copolyesters, and aliphatic polyesters. Because these polymers are biodegradable in a composting environment, they have utility in a variety of disposable articles, including diapers, sanitary napkins, bed liners, food bags, trash bags, films, and fibers.

Examples of other known biodegradable polymers are poly(vinyl alcohol), poly(ethylene-co-vinyl alcohol), poly(vinyl acetate), and poly(ethylene-co-vinyl acetate). Poly(vinyl alcohol) is a water soluble synthetic polymer that is used extensively in fibers, films, papers, and adhesives. Poly(ethylene-co-vinyl alcohol) is a thermoplastic material commonly used in laminates for food containers due to its excellent film forming and oxygen barrier properties.

Despite the desire to reduce pollution, it may not be feasible to use conventional biodegradable polymers or biodegradable polymer compositions in situations where degradation may start prior to the end of the useful life of the product formed from the biodegradable polymer or biodegradable polymer composition. For instance, people may place biodegradable garbage bags outside of the home several weeks or possibly even months before they are disposed of at a dump site. If the degradation rate of a garbage bag is high enough to result in biodegradation of the plastic bag after only a few weeks of exposure to microbes, the bag could disappear while the garbage is sitting outside. There would then be no way to carry the garbage to a dump site. Even worse, animals looking for food may scatter the garbage all over a person's yard.

In view of the foregoing, there exists a need to develop a method for slowing the degradation rate of a biodegradable polymer. Such a method would make biodegradable articles more attractive in cases where the article needs to remain intact for a period of time after being exposed to microbes. For example, a person could place garbage in his yard for several weeks without being concerned that the bag containing the garbage might degrade before the garbage can be picked up for dumping.

SUMMARY OF THE INVENTION

In one aspect, the invention provides a method for slowing the degradation rate of a biodegradable polymer or biodegradable polymer composition. In another aspect, the invention provides a biodegradable polymer composition comprising a biodegradable polymer or biodegradable polymer-second material composition and a phenol-containing compound mixed therein.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific methods, formulations, and conditions described, as such may, of course, vary. It is also to be understood that the terminology used herein is for the purpose of describing particular embodiments only and is not intended to be limiting.

In this specification and in the claims that follow, reference will be made to a number of terms, which shall be defined to have the following meanings.

The singular forms "a," "an," and "the" include plural referents unless the context clearly dictates otherwise.

Ranges may be expressed herein as from "about" one particular value and/or to "about" or another particular value. When such a range is expressed, another embodiment includes from the one particular value and/or to the other particular value. Similarly, when values are expressed as approximations, by use of the antecedent "about," it will be understood that the particular value forms another embodiment.

"Slowing" is a synonym for reducing, decreasing, and retarding, and "slow" is a synonym for reduce, decrease, and retard. As utilized herein, a slower degradation rate means that the biodegradable polymers or biodegradable polymer compositions herein exhibit a delayed biodegradation rate over biodegradable polymers or biodegradable polymer compositions not including phenol-containing compounds. For example, when a garbage bag is prepared from biodegradable polymers or biodegradable polymer compositions having a phenol-containing compound, the garbage bag, while still "biodegradable," may not degrade as quickly as a garbage bag prepared from the same biodegradable polymer or biodegradable polymer composition not including a phenol-containing compound.

As used herein, "mixing" encompasses any method for forming a material comprising two or more components, where each component is substantially integrated throughout the composition. Any methods of mixing known to a person skilled in the art of chemistry and chemical engineering fall within the meaning of the term "mixing." Examples of appropriate methods of mixing are admixing, melt blending, and dry blending. Blending may be performed using, e.g., a melt extruder, a kneader extruder, a roll mill, a high shear mixer, or a twin screw compounder.

By "total weight of the biodegradable polymer or biodegradable polymer composition" it is meant that the amount of added phenol-containing compound is measured without any added materials i.e., the weight of added phenol-containing compound is based upon the neat biodegradable polymer or neat biodegradable polymer composition. By weight of the phenol-containing compound, it is meant that the amount of phenol is measured by total weight of the compound containing the phenol.

Throughout this application, where patents are referenced, the disclosures of these patents in their entireties are hereby incorporated into this application in order to more fully describe the state of the art to which this invention pertains.

The invention generally relates to a method for slowing the degradation rate of a biodegradable polymer or biodegradable polymer composition by introducing a phenol-containing compound into a biodegradable polymer or biodegradable polymer composition in an amount sufficient to slow the degradation rate of the polymer or polymer composition and mixing the phenol-containing compound therein. Another aspect of the invention is a biodegradable polymer composition comprising a phenol-containing compound mixed with a biodegradable polymer or a biodegradable polymer-second material. The phenol-containing compound is preferably present at an amount sufficient to slow the degradation rate thereof.

In a preferred embodiment, the mixing of the phenol-containing compound and the biodegradable polymer or biodegradable polymer composition results in the phenol-containing compound being uniformly distributed therein.

Without being bound by theory, it is believed that the phenol-containing compound slows the degradation of the biodegradable polymer or biodegradable polymer composition by inhibiting the action of the microbes that break down the polymer. Thus, as utilized herein, the phenol-containing compounds are added to biodegradable polymers or to biodegradable polymer compositions. It is also believed that the rate of degradation decreases as the amount of phenol mixed with the biodegradable polymer or biodegradable polymer composition is increased. As such, in accordance with the methods herein, the degradation rate of the biodegradable polymer or biodegradable polymer composition may be adjusted to a desired value by varying the amount of phenol in the phenol-containing compound and/or the amount of phenol-containing compound that is introduced into the biodegradable polymer or biodegradable polymer composition. The degradation rate of a biodegradable polymer or biodegradable polymer composition therefore may be reduced to the value desired for the particular type of end product to be formed.

As utilized herein the terms "biodegradable polymer" or "biodegradable polymer composition" shall mean that the materials experience a breakdown in molecular weight as a result of attack by microbial species or by prolonged exposure to the elements (sun, heat, cold, rain, wind, etc.) or a combination of both phenomena.

A "biodegradable polymer composition" means in one aspect a composition formed from a polymer and a second material, wherein the second material is subject to microbial or elemental attack. For example, in a composition of a polymer and starch, the starch may be degraded by microbes to cause breakdown of the polymer composition, whether or not the polymer itself may be considered "biodegradable." Suitable second materials that may be utilized in the invention include, but are not limited to, starch, cellulose, carbohydrates, and natural gums. In a second aspect, the term "biodegradable polymer composition" means compositions of the present invention formed from mixing a biodegradable polymer or the biodegradable polymer composition of the first aspect with a phenol-containing compound. The distinctions between the two types of biodegradable polymer compositions as utilized herein will be apparent to one of ordinary skill in the art.

While it is contemplated that any phenol-containing compound may be used, terpene-phenol resin is a preferred phenol-containing compound. One property of terpene-phenol resin that makes it attractive for use in the present invention is that it is food safe and would not harm someone, e.g., a child, who ingests a material containing it.

The synthesis of terpene-phenol resins is well known in the art, for they are commonly used as components of adhesives, sealants and coatings. Terpene-phenol resins are polymeric products commonly prepared by the acid-catalyzed alkylation of phenol with an olefinically unsaturated material derived from naturally occurring resins (e.g. pine oils). The phenol content of these resins may be controlled by adjusting the ratio of phenol to olefinically unsaturated material used in the synthesis.

Various patents describe the forming of phenol-terpene resins by an alkylation process. For example, G.B. Patent No. 1,012,045 describes the use of boron trifluoride or sulfuric acid as catalysts to prepare terpene-phenol products containing 7.5–8% hydroxyl groups. Fr. Patent No. 1,364,247 describes the use of a variety of Friedel-Crafts catalysts, including boron trifluoride, aluminum trichloride, zinc chloride, ferric chloride and stannic chloride to produce terpene-phenol resins having a hydroxyl number of 123.5. DE Patent No. 1,133,126 describes the use of a boron trifluoride catalyst to prepare a terpene-phenol resin having a hydroxyl number of 115. Each of these referenced patents are herein incorporated in their entireties by this reference.

Phenol-terpene resins are commercially available from Arizona Chemical Co. under the trade name NIREZO. U.S. Pat. No. 5,457,175, which is assigned to Arizona Chemical Co. describes a process for preparing a terpene-phenol resin. U.S. Pat. No. 5,457,175 is herein incorporated in its entirety by this reference. One phenol-terpene resin product suitable for use with this invention is NIREZO 7402.

Other phenol-containing compounds that may be mixed with biodegradable polymers or biodegradable polymer compositions to slow the degradation rate thereof include, but are not limited to, poly(vinylphenol), phenolic antioxidant, or any material capable of releasing a phenol upon hydrolysis. The phenolic compound utilized in the invention herein may preferably comprise one or more of the following compounds: 4,4'-thio-bis(2-t-butyl-5-methylphenol), polymeric alkylated phenol, 2,5-di-t-amylhydroquinone, 1,1-di-(2-methyl4-hydroxy-5-t-butylphenyl)butane, or 1,1'-thio-bis(2-hydroxynaphthalene). Furthermore, the material capable of releasing a phenol upon hydrolysis may comprise one or more of the following compounds: diphenyl-isodecyl phosphite, diisodecylphenyl phosphite, tris(p-nonylphenyl)phosphite, and tris[3-methyl-4-(2-methyl-4-hydroxy-5-t-butylphenylthio)-6-t-butyl) phosphite.

According to an embodiment of the invention, the phenol content of phenol-terpene resin and of all of the above-listed compounds (except poly(vinylphenol)) ranges from about 1 to about 40%, preferably from about 5 to about 20%, by weight as measured by weight of the phenol-containing compound. When the phenol-containing compound comprises poly(vinylphenol), it is preferred that the phenol content of the compound is equal to or less than about 77.5% by weight of the phenol-containing compound. However, one of ordinary skill in the art will recognize that vinylphenol may be copolymerized with other vinyl monomers thereby resulting in a different phenol content in the phenol-containing compound.

The amount of phenol-containing compound introduced into a biodegradable polymer or biodegradable polymer composition ranges from about 0.1 to about 10%, from about 0.5 to about 5%, or, more preferably, from about 1 to about 3%, by weight as measured by the weight of the total weight of the biodegradable polymer or biodegradable polymer composition. One of ordinary skill in the art will recognize that the specific amount of phenol-containing compound added to the biodegradable polymer or biodegradable polymer composition can vary depending on the intended use of the biodegradable polymer or biodegradable polymer composition and on the concentration of phenol present in the phenol-containing compound.

The invention relates to the introduction of a phenol-containing compound into any polymer or polymer composition that is biodegradable. Preferably, the compound is added to one or more of the following biodegradable polymers or biodegradable polymer compositions containing such polymers:

a) an aliphatic-aromatic copolyester having repeat units of the following structures:

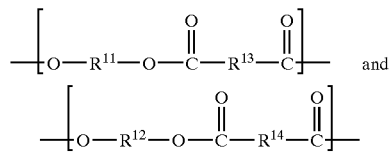

wherein:
(i) $R_{11}$ and $R^{12}$ are the same or different, and are residues of diethylene glycol, propylene glycol, 1,3-propanediol, 2,2-dimethyl-1,3-propanediol, 1,3-butanediol, 1,4-butanediol, 1,5-pentanediol, 1,6hexanediol, 2,2,4-trimethyl-1,6-hexanediol, thiodiethanol, 1,3-cyclohexanedimathanol, 1,4-cyclohexanedimathanol, 2,2,4,4-tetramethyl-1,3-cyclobutanediol, triethylene glycol, tetraethylene glycol, or a mixture thereof;
(ii) $R^{11}$ and $R^{12}$ are 100% of the diol components in the copolyester;
(iii) $R^{13}$ is absent or is selected from one or more of the groups consisting of $C_1$–$C_{12}$ alkylene or oxyalkylene; $C_1$–$C_{12}$ alkylene or oxyalkylene substituted with one to four substituents independently selected from the group consisting of halo, $C_6$–$C_{10}$ aryl, and $C_1$–$C_4$ alkoxy; $C_1$–$C_{10}$ cycloalkylene; and $C_5$–$C_{10}$ cycloalkylene substituted with one to four substituents independently selected from the group consisting of halo, $C_6$–$C_{10}$ aryl, and $C_1$–$C_4$ alkoxy; and
(iv) $R^{14}$ is selected from one or more of the groups consisting of $C_6$–$C_{10}$ aryl, and $C_6$–$C_{10}$ aryl substituted with one to four substituents independently selected from the group consisting of halo, $C_1$–$C_4$ alkyl, and $C_1$–$C_4$ alkoxy;

b) an aliphatic polyester having repeat units of one or more of the following structures:

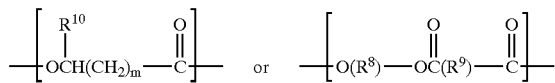

wherein m is an integer of from 0 to 10, and $R^{10}$ is selected from the group consisting of hydrogen; $C_1$–$C_{12}$ alkyl; $C_1$–$C_{12}$ alkyl substituted with one to four substituents independently selected from the group consisting of halo, $C_6$–$C_{10}$ aryl, and $C^1$–$C_4$ alkoxy; $C^5$–$C_{10}$ cycloalkyl; and $C_5$–$C_{10}$ cycloalkyl substituted with one to four substituents independently selected from the group consisting of halo, $C_6$–$C_{10}$ aryl, and $C^1$–$C_4$ alkoxy, wherein $R^8$ is selected from the group consisting of $C_2$–$C_{12}$ alkylene or $C_2$–$C_{12}$ oxyalkylene; $C_2$–$C_{12}$ alkylene or $C^2$–$C_{12}$ oxyalkylene substituted with one to four substituents independently selected from the group consisting of halo, $C_6$–$C_{10}$ aryl, and $C_1$–$C_4$ alkoxy; $C_5$–$C_{10}$ cycloalkylene; $C_5$–$C_{10}$ cycloalkylene substituted with one to four substituents independently selected from the group consisting of halo, $C_6$–$C_{10}$ aryl, and $C^1$–$C_4$ alkoxy, and wherein $R^9$ is absent or is selected from one or more of the groups consisting of $C^1$–$C_{12}$ alkylene or oxyalkylene; $C_1$–$C_{12}$ alkylene or oxyalkylene substituted with one to four substituents independently selected from the group consisting of halo, $C_6$–$C_{10}$ aryl, and $C^1$–$C_4$ alkoxy; $C_5$–$C_{10}$ cycloalkylene; and $C_5$–$C_{10}$ cycloalkylene substituted with one to four substituents independently selected from the group consisting of halo, $C_6$–$C_{10}$ aryl, and $C^1$–$C_4$ alkoxy; or c) a $C_1$–$C_{10}$ cellulose ester having a DS of equal to or less than about 2.5.

U.S. Pat. Nos. 5,292,783, 5,446,079, 5,559,171, 5,580,911, 5,599,858, 5,900,322, 5,480,962 and 5,498,453 provide detailed descriptions of how to make and use these particular biodegradable polymers. The terms "alkyl" and "alkylene" refer to either straight or branched chain moieties such as —$CH_2$—$CH_2$—$CH_2$—$CH_2$—and —$CH_2CH(X)$—$CH_2$—. Also, all of the carbon atoms of the cycloalkyl and cycloalkylene moieties are not necessarily in the ring structure, e.g., a $CH_8$ cycloalkyl group can be cyclooctyl or dimethylcyclohexyl. The term "oxyalkylene" refers to alkylene chains containing from 1 to 4 ether oxygen groups.

When the biodegradable polymer is an aliphatic-aromatic copolyester, $R^{11}$ and $R^{12}$ are preferably the same or different and are selected from the group consisting of residues of one or more of glycol, propylene glycol, 1,3-propanediol, 1,3-butanediol, and 1,4-butanediol. Furthermore, $R^{13}$ is selected from the group consisting of malonic acid, succinic acid, glutaric acid, adipic acid, pimelic acid, 2,2-dimethyl glutaric acid, diglycolic acid, and an ester forming derivative thereof. Also, $R^{14}$ is selected from the group consisting of one or more of 1,4,terephthalic acid, 1,3-terephthalic acid, 2,6-naphthoic acid, 1,5-naphthoic acid, and an ester forming derivative thereof Preferably, the aliphatic-aromatic copolyester comprises from about 10 to about 1,000 repeating units. Most preferably, the aliphatic-aromatic copolyester comprises from about 15 to about 600 repeating units. It is further preferred that the aliphatic-aromatic copolyester has an inherent viscosity of about 0.4 to about 1.2 as measured at a temperature of 25° C. for a 0.5 gram sample in 100 ml of a 60/40 by weight solution of phenol/tetrachloroethane.

The aliphatic-aromatic copolyester may also be blended with other polymers for preparation of a biodegradable polymer composition. Specific examples of aliphatic-aromatic copolyesters that may be blended with other polymers include one or more of: poly(tetramethylene glutarate-co-terephthalate-co-diglycolate), poly(tetramethylene glutarate-co-terephthalate), poly(ethylene glutarate-co-terephthalate), poly(tetramethylene adipate-co-terephthalate), poly(tetramethylene succinate-co-terephthalate), and poly(tetramethylene-co-ethylene glutarate-co-terephthalate). The aliphatic-aromatic copolyester may also be mixed with a second material such as starch, cellulose or filler material to provide a biodegradable polymer composition.

Specific examples of aliphatic-aromatic copolyesters for applications where blending may not be required include one or more of: poly(tetramethylene glutarate-co-terephthalate-co-diglycolate), poly(tetramnethylene glutarate-co-terephthalate), poly(ethylene succinate-co-terephthalate), poly(tetramethylene adipate-co-terephthalate), and poly(tetramethylene succinate-co-terephthalate).

With respect to the aliphatic polyester, $R_8$ is preferably $C_2$–$C_4$ alkylene, $C_4$–$C_8$ oxyalkylene, or $C_5$–$C_{10}$ cycloalkylene, and $R_9$ is preferably $C_2$–$C_4$ alkylene, $C_2$ oxyalkylene or $C_5$–$C_{10}$ cycloalkylene. It is also preferred that the aliphatic polyester comprises from about 10 to about 1,000 repeating units. Most preferred is when said aliphatic polyester comprises from about 15 to about 600 repeating units.

Specific examples of aliphatic polyesters suitable for use as the biodegradable polymer or for inclusion into biodegradable polymer compositions of the present invention include one or more of polyhydroxybutyrate, a copolymer of polyhydroxybutyrate and polyhydroxyvalerate, poly(hexamethylene glutarate), poly(hexarnethylene adipate), poly(ethylene sebacate), poly(tetramethylene glutarate), poly(tetramethylene adipate), poly(tetramethylene sebacate), poly(ethyleneglutarate), poly(ethylene succinate), poly(tetramethylene succinate), and poly(ethylene adipate).

Preferred cellulose esters that are biodegradable or that may be utilized in biodegradable polymer compositions include cellulose acetate (CA), cellulose propionate (CP), cellulose butyrate (CB), cellulose acetate propionate (CAP), cellulose acetate butyrate (CAB), cellulose propionate butyrate (CPB), and the like. CAP and CAB are more preferred cellulose esters. It is preferred that the DS of the cellulose ester be equal to or less than about 2.5, more preferably less than about 2.25 and, still further preferably, less than about 2.0.

Additional biodegradable polymers that may be used in this invention comprise one or more of: poly(vinyl alcohol), poly(etyhylene-co-vinyl alcohol), poly(vinyl acetate), poly(ethylene-covinyl acetate), poly(glycolic acid), poly(lactic acid), polycaprolactone, poly(alkylene D-tartrate), polypdioxanone, polyorthoformate, poly(oxyethylene glycoates), polyethylene oxide, and polyhydroxyalkanoate.

The biodegradable polymer compositions of this invention may also have incorporated therein other materials that render the polymers more suitable for their end-use applications. These materials include colorants such as pigments and dyes, opacifying agents, titanium dioxide, zinc oxide, antioxidants, ultraviolet stabilizers, optical brighteners, processing aids such as aliphatic acid metal salts, antistatic agents, antiblocking aids, fillers, dispersing agents, coating aids, slip agents, lubricants, and the like, as is well known to those skilled in the art. Specific examples of pigments include barium sulfate, colloidal or amorphous silica, and calcium carbonate. The biodegradable polymers may also contain materials that function as foods for the microbial agents, e.g., starch, wood, or flour. Additionally, materials that increase the porosity or water/air diffusion in the polymer may be introduced into the polymer.

The biodegradable polymers and biodegradable polymer compositions may be prepared into any one of a number of products as will be recognized by one of skill in the art. As a non-exhaustive list the biodegradable polymer compositions may be formed into films, bottles, blow molded articles, injection molded articles, and containers. The biodegradable polymers and biodegradable polymer compositions of the present invention have utility in waste collection, agriculture, and food packaging applications. Specifically, they may be used to form disposable articles, such as compost bags, garbage bags, fast-food disposables, agricultural articles, hygiene articles, paper coatings, and agricultural mulch films. Still further, the biodegradable polymers and biodegradable polymer compositions of the present invention may be utilized in any application where biodegradability is desired, but where it is preferred that such biodegradability be delayed. The length of time required to biodegrade such articles may be extended by the practice of this invention.

EXAMPLES

The following examples are put forth so as to provide those of ordinary skill in the art with a complete disclosure and description of how the compositions of matter and methods claimed herein are made and evaluated, and are not intended to limit the scope of what the inventors regard as the invention. Efforts have been made to insure accuracy with respect to numbers (e.g., amounts, temperature, etc.) but some errors and deviations should be accounted for. Unless indicated otherwise, pressure is at or near atmosphere. Also, as used in the examples below, wt % stands for weight % as measured by weight of the polymer composition that is formed. Furthermore, the terpene-phenol resin referred to in the examples is NIREZ® 7402.

Example 1

A copolyester of adipic acid, terephthalic acid, and 1,4-butanediol was melt-compounded with 6 wt % talc and 0, 0.1, 0.5, and 1.0 wt % terpene-phenol resin, respectively. The formulations were then melt-extruded into 1-mil (0.001 inch) films strips, which were then cut into 25×125 mm sections for biodegradability evaluations. The film strips were placed in polyethylene bags containing fresh grass clippings and were aged in the dark at 74° F. for up to 28 days. The film strips were then inspected periodically for breakage or cracking. The results of this experiment are summarized in Table 1. It can be seen from this data that the presence of 1.0 wt % terpene-phenol resin extended the degradation time of the copolyester from 2 weeks to 3 weeks, and thereby effectiveness as a biodegradable polymer composition is demonstrated.

TABLE 1

| Wt % Terpene-Phenol Resin | Days Aged | Cracks/Brittleness (Yes/No) |
| --- | --- | --- |
| 0 | 0 | No |
| 0 | 7 | No |
| 0 | 14 | Yes |
| 0.1 | 0 | No |
| 0.1 | 7 | No |
| 0.1 | 14 | Yes |
| 0.5 | 0 | No |
| 0.5 | 7 | No |
| 0.5 | 14 | Yes |
| 1.0 | 0 | No |
| 1.0 | 7 | No |
| 1.0 | 14 | No |
| 1.0 | 21 | Yes |

Example 2

Test specimens that were 120×150 mm in size were prepared in the same manner as in Example 1. They were placed in composted grass approximately 9 months old and covered with the compost to a depth of about 12 inches. The covered specimens were then aged for 3 weeks with ambient day/night temperatures of about 60/40° F. Visual inspection provided the results shown in Table 2. The sample containing 1% of the terpene-phenol resin was much less degraded than the control sample containing no terpene-phenol resin.

TABLE 2

| Wt % Terpene-Phenol | Yellow Spots | Cracks or Holes |
| --- | --- | --- |
| 0 | 10 | 4 |
| 1.0 | 2 | 1 |

Example 3

A total of 20 test specimens were prepared in the manner described in Example 1. The specimens were placed on approximately 6 inches of fresh grass clippings and covered with approximately 6 inches of additional grass clippings. Each specimen was then stored in a black polyethylene bag at a temperature of 68–70° F. in a room having only interior lighting. The films were inspected weekly for degradation. The partially composted grass was replaced with fresh grass clippings for the third week of the evaluations. Failure was based on the presence of one or more cracks of 14 inch or greater, or on fragmentation of the films. The results are summarized in Table 3. It is readily apparent that the presence of 1.5 and 2.0 wt % terpene-phenol resin reduced the number of specimens exhibiting failure at all of the time intervals.

TABLE 3

| | Failures After Weeks Noted | | |
| --- | --- | --- | --- |
| Wt % Terpene-Phenol | 1 | 2 | 3 |
| 0 | 2/5 | 4/5 | 5/5 |
| 1.0 | 3/5 | 4/5 | 5/5 |
| 1.5 | 0 | 2/5 | 3/5 |
| 2.0 | 0 | 0 | 1/5 |

Example 4

Test specimens that were 75×125 mm in size were prepared according to the method described in Example 1 and were buried to a depth of approximately 18 inches in a 1-year old compost pile of mixed leaves and grass clippings. The specimens were visually inspected after they had been aged at typical ambient day/night temperatures of about 80/60° F. The results of this experiment are shown in Table 4. The samples containing 1.0 to 2.0 wt % terpene-phenol resin showed no cracking or holes after 6 weeks of aging and appeared much less discolored than the sample containing no terpene-phenol resin.

TABLE 4

| Wt % Terpene-Phenol Resin | Weeks Aged | Cracks or Holes | Comments |
| --- | --- | --- | --- |
| 0 | 3 | 1 | |
| | 6 | 5 | Most of surface of film discolored with yellow or brown spots |
| 1.0 | 3 | 0 | |
| | 6 | 0 | Slight discoloration |

TABLE 4-continued

| Wt % Terpene-Phenol Resin | Weeks Aged | Cracks or Holes | Comments |
|---|---|---|---|
| 1.5 | 3 | 0 | |
| | 6 | 0 | Slight discoloration |
| 2.0 | 3 | 0 | |
| | 6 | 0 | Slight discoloration |

The invention has been described in detail with particular reference to preferred embodiments thereof, but it will be understood that variations and modifications can be effected without departing from the scope and spirit of the invention.

What is claimed is:

1. A method for preparing an article from a biodegradable polymer composition wherein the method comprises:
 a. introducing a phenol-containing compound comprising terpene-phenol resin into a composition comprising a biodegradable polymer having a degradation rate, wherein the phenol-containing compound is added in an amount sufficient to slow the degradation rate of the biodegradable polymer; and
 b. mixing the phenol-containing compound with the biodegradable polymer thereby providing a biodegradable polymer composition;
 wherein the biodegradable polymer consists essentially of:
 an aliphatic-aromatic copolyester having repeat units of the following

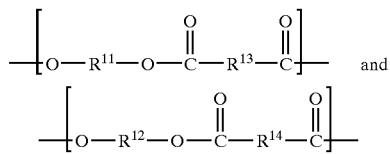 and wherein
 (i) $R^{11}$ and $R^{12}$ are the same or different, and are residues of one or more of diethylene glycol, propylene glycol, 1,3-propanediol, 2,2dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, or tetraethylene glycol;
 (ii) $R^{11}$ and $R^{12}$ are 100% of the diol components in the copolyester;
 (iii) $R^{13}$ is absent or is selected from one or more of the groups consisting of $C_1$–$C_{12}$ alkylene or oxyalkylene; $C^1$–$C_{12}$ alkylene or oxyalkylene substituted with one to four substituents independently selected from the group consisting of halo, $C_6$–$C_{10}$ aryl, and $C_1$–$C_4$ alkoxy; $C_5$–$C_{10}$ cycloalkylene; and $C_5$–$C_{10}$ cycloalkylene substituted with one to four substituents independently selected from the group consisting of halo, $C_6$–$C_{10}$ aryl, and $C_1$–$C_4$ alkoxy; and
 (iv) $R^{14}$ is selected from one or more of the groups consisting of $C_6$–$C_{10}$ aryl, and $C_6$–$C_{10}$ aryl substituted with one to four substituents independently selected from the group consisting of halo, $C_1$–$C_4$ alkyl, and $C^1$–$C_4$ alkoxy; and c. forming the biodegradable polymer composition into an article, wherein the article comprises: a film, a bottle, a blow molded article, an injection molded article or a container, and wherein the article exhibits a delayed biodegradation rate over an article formed from a biodegradable polymer composition not including the phenol-containing compound.

2. The method of claim 1 wherein the terpene-phenol resin comprises from about 1 to about 40% by weight of phenol as measured by weight of the compound.

3. The method of claim 1 wherein the terpene-phenol resin comprises from about 5 to about 20% by weight of phenol as measured by weight of the compound.

4. The method of claim 1 wherein the phenol-containing compound is present in the biodegradable polymer composition at from about 0.5 to about 10 weight % as measured by the total weight of the biodegradable polymer composition.

5. The method of claim 1 wherein the phenol-containing compound is present in the biodegradable polymer composition at from about 1 to about 3 weight % as measured by the total weight of the biodegradable polymer composition.

6. The method of claim 1 wherein $R^{11}$ and $R^{12}$ are the same or different, and are selected from the group consisting of residues of one or more of diethylene glycol, propylene glycol, 1,3-propanediol, 1,3-butanediol, and 1,4-butanediol, $R^{13}$ is selected from the group consisting of malonic acid, succinic acid, glutaric acid, adipic acid, pimelic acid, 2,2-dimethyl glutaric acid, diglycolic acid, and an ester forming derivative thereof, and $R^{14}$ is selected from the group consisting of one or more of 1,4-terephthalic acid, 1,3-terephthalic acid, 2,6naphthoic acid, 1,5-napthoic acid, and an ester forming derivative thereof.

7. The method of claim 1, wherein the biodegradable polymer composition further comprises one or more of: a pigment, a dye, an opacifying agent, an antioxidant, an ultraviolet stabilizer, an optical brightener, an aliphatic acid, a metal salt, an antistatic agent, an antiblocking aid, a filler, a dispersing agent, a coating aid, a slip agent, a lubricant, starch, wood, and flour.

8. A biodegradable polymer composition for making an article comprising a film, a bottle, a blow molded article, an injection molded article or a container, wherein the biodegradable polymer composition comprises:
 a. a biodegradable polymer consisting essentially of:
 an aliphatic-aromatic copolyester having repeat units of the following structures:

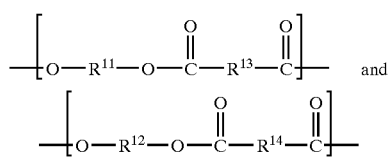 and wherein
 (i) $R^{11}$ and $R^{12}$ are the same or different, and are residues of one or more of diethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, or tetraethylene glycol;
 (ii) $R^{11}$ and $R^{12}$ are 100% of the diol components in the copolyester;

(iii) $R^{13}$ is absent or is selected from one or more of the groups consisting of $C_1$–$C_{12}$ alkylene or oxyalkylene; $C_1$–$C_{12}$ alkylene or oxyalkylene substituted with one to four substituents independently selected from the group consisting of halo, $C_6$–$C_{10}$ aryl, and $C_1$–$C_4$ alkoxy; $C_5$–$C_{10}$ cycloalkylene; and $C_5$–$C_{10}$ cycloalkylene substituted with one to four substituents independently selected from the group consisting of halo, $C_6$–$C_{10}$ aryl, and $C_1$–$C_4$ alkoxy; and (iv) $R^{14}$ is selected from one or more of the groups consisting of $C_6$–$C_{10}$ aryl, and $C_6$–$C_{10}$ aryl substituted with one to four substituents independently selected from the group consisting of halo, $C_1$–$C_4$ alkyl, and $C^1$–$C_4$ alkoxy; and b. a phenol-containing compound comprising terpene-phenol resin, wherein the phenol-containing compound is present in the biodegradable polymer composition at an amount sufficient to slow the degradation rate of the biodegradable polymer, and wherein the article exhibits a delayed biodegradation rate over an article formed from a biodegradable polymer composition not including the phenol-containing compound.

9. The biodegradable polymer composition of claim 8 wherein $R^{11}$ and $R^{12}$ are the same or different, and are selected from the group consisting of residues of one or more of diethylene glycol, propylene glycol, 1,3-propanediol, 1,3-butanediol, and 1,4-butanediol, $R^{13}$ is selected from the group consisting of malonic acid, succinic acid, glutaric acid, adipic acid, pimelic acid, 2,2-dimethyl glutaric acid, diglycolic acid, and an ester forming derivative. thereof, and $R^{14}$ is selected from the group consisting of one or more of 1,4-terephthalic acid, 1,3-terephthalic acid, 2,6-naphthoic acid, 1,5-naphthoic acid, and an ester forming derivative thereof.

10. The biodegradable polymer composition of claim 8 wherein the phenol-containing compound comprises from about 1 to about 40% by weight of phenol as measured by weight of the compound.

11. The biodegradable polymer composition of claim 8 wherein the phenol-containing compound is present in the biodegradable polymer composition in amount of from about 0.5 to about 10 weight % as measured by weight of the biodegradable polymer composition.

12. The biodegradable polymer composition of claim 8 wherein the phenol-containing compound is present in the biodegradable polymer composition in an amount of from about 1 to about 3 weight % as measured by weight of the biodegradable polymer composition.

13. The biodegradable polymer composition of claim 8, wherein the biodegradable polymer composition further comprises one or more of: a pigment, a dye, an opacifying agent, an antioxidant, an ultraviolet stabilizer, an optical brightener, an aliphatic acid, a metal salt, an antistatic agent, an antiblocking aid, a filler, a dispersing agent, a coating aid, a slip agent, a lubricant, starch, wood, and flour.

* * * * *

UNITED STATES PATENT AND TRADEMARK OFFICE
CERTIFICATE OF CORRECTION

PATENT NO. : 6,767,972 B1
DATED : July 27, 2004
INVENTOR(S) : Irick et al.

It is certified that error appears in the above-identified patent and that said Letters Patent is hereby corrected as shown below:

Column 11,
Line 30, reads "the following" but should read -- the following structures --
Line 55, reads "alkylene; $C^1$-$C_{12}$ alkylene or oxyalkylene substi" but should read
-- alkylene; $C_1$-$C_{12}$ alkylene or oxyalkylene substi --
Line 67, reads "$C_1$-$C_4$ alkyl, and $C^1$-$C_4$ alkoxy; and" but should read -- $C_1$-$C_4$ alkyl, and $C_1$-$C_4$ alkoxy; and --

Column 12,
Line 32, reads "terephthalic acid, 2,6naphthoic acid, 1,5-napthoic acid, and" but should read -- terephthalic acid, 2,6-naphthoic acid, 1,5-napthoic acid, and --

Column 13,
Line 15, reads "$C_1$-$C_4$ alkyl, and $C^1$-$C_4$ alkoxy; and" but should read -- $C_1$-$C_4$,alkyl, and $C_1$-$C_4$ alkoxy; and --

Signed and Sealed this

Fifteenth Day of February, 2005

JON W. DUDAS
*Director of the United States Patent and Trademark Office*